Jan. 23, 1968  A. ZAJDLER  3,364,950
HYDRAULIC SHOCK ABSORBERS
Filed Oct. 24, 1965
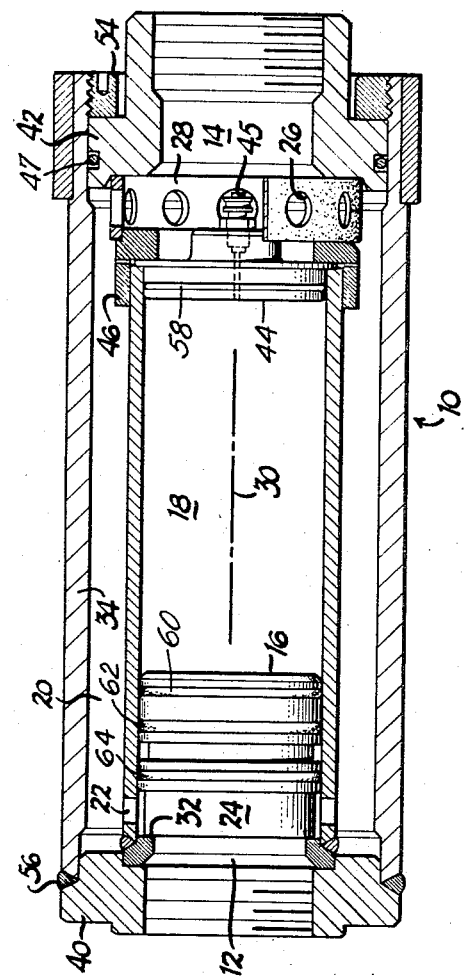
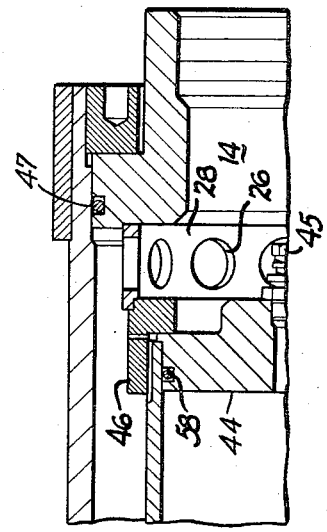
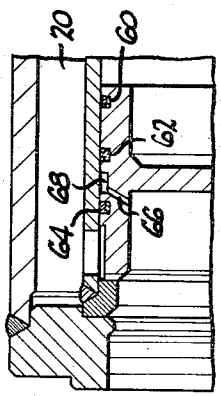
Inventor:
ANDREW ZAJDLER
By
Wilson, Settle, Batchelder
Att'ys. & Craig

United States Patent Office 3,364,950
Patented Jan. 23, 1968

3,364,950
HYDRAULIC SHOCK ABSORBERS
Andrew Zajdler, 2093 Marshfield Blvd.,
Westlake, Ohio 44090
Filed Oct. 24, 1965, Ser. No. 504,533
3 Claims. (Cl. 138—31)

ABSTRACT OF THE DISCLOSURE

A shock absorber has a piston and cylinder assembly containing compressible fluid and is surrounded by a chamber for the passage of noncompressible fluid therethrough in heat exchange relation with the cylinder and the flow of the noncompressible fluid through the chamber is controlled by the piston which controls the flow of noncompressible fluid through the chamber to control the dissipation of heat in the shock absorber.

This invention relates generally to hydraulic shock absorbers. More particularly, this invention relates to hydraulic shock absorber cooling by communication to the hydraulic fluid flow portion of a substantial heat induced in the shock absorber.

In the art of shock absorbing hydraulic systems, in providing an energy accumulator which operates to reduce transient pressure amplitude in the conduction of fluid in the system in a uniform manner, it has been difficult to expeditiously and inexpensively eliminate undesirable effects of friction and heat. Where such shock absorbers depend upon the compression of gas in a piston and cylinder container to absorb the shock of transient pressure increases in the conduction of fluid, the heating of the gas so contained, and resultant conduction of heat to the cylinder and piston, impose severe design constraints and costs on the shock absorbing apparatus. Applicant has recognized that the problem boils down to finding a simple, effective and inexpensive means of cooling the accumulator of a shock absorber.

Simply, what applicant has done is to solve this problem by providing a simple design whereby the accumulator is effectively cooled by the very liquid whose transient energy it absorbs.

It is therefore an object of this invention to provide a hydraulic system with a shock absorber for absorbing the transient pressure increase in transporting liquid, an accumulator of the resultant energy which is efficiently and inexpensively cooled.

It is an object of this invention to cool the accumulator of a shock absorber by providing a chamber for conducting cooling fluid around an accumulator which absorbs the energy of transient increases in pressure on the fluid.

It is an object of this invention to provide an efficient inexpensive means of cooling as well as conducting liquid in a substantially friction free accumulator of energy from transient increase of pressure on the fluid in a hydraulic system.

These objects are accomplished by providing in a hydraulic system, a piston and cylinder containment of gas having a predetermined pressure where motion of the piston adiabatically compresses the gas. A chamber having an annular cylindrical inner wall coaxial and highly thermally conductive with the cylinder and piston. This chamber is operable to conduct a flow of fluid from an entry port to an exit port with respect to the hydraulic system, when the piston translates to a position in a direction of pressure increase in the system of fluid conduction. This chamber is also highly thermally conductive with the fluid flow.

On the drawings:

FIGURE 1 is a transverse cross-section of a preferred embodiment of this invention;

FIGURE 2 is an enlarged partial transverse cross-section of the embodiment of the invention shown in FIGURE 1; and FIGURE 3 is another enlarged partial transverse cross-section of the embodiment in the invention shown in FIGURE 1.

As shown in the drawings:

Referring to FIGURE 1, there is shown in partial cross-section, a shock absorber 10 for use in the hydraulic system embodying the present invention. The shock absorber 10 has an entry port 12 and an exit port 14 for the transport of liquid in the hydraulic system. A piston 16 and cylinder 18 contain a gas sealed therein at a predetermined pressure when the piston is at the position shown in FIGURE 1.

A conduit 20 is operable to transport the hydraulic liquid in its path from the entry port to the exit port. Entry of hydraulic liquid into the conduit 20 is through a vent or aperture 22 in the conduit near the entry port. As the device is pictured in FIGURE 1, flow of hydraulic liquid through aperture 22 is blocked by a neck portion 24 of the piston 16. Exhaust of hydraulic liquid from the conduit 20 is provided through apertures 26 in ring 28 that conducts hydraulic liquid from the conduit 20 to the exit port 14.

Ring 28 is coaxial with conduit 20 and cylinder 18 on axis 30.

The piston 16 is free to translate on axis 30. This translation is limited in a direction towards the entry port 12 by an annular projection 32 that stops the travel of piston 16 towards the entry port.

The outer wall 34 of the shock absorber 10 also serves as the outer wall of conduit 20. This wall is a cylindrical shell and is coaxial with cylinder 18 on axis 30. The cylinder 18 not only provides the outer enclosure for gas in the energy accumulator portion of the shock absorber, but in addition provides an inner cylindrical wall of the conduit 20.

The gas is enclosed in the accumulator portion of the shock absorber by the cylinder 18, the piston 16 and a cap 44 on the rearward portion of the shock absorber. The cap 44 is secured to the cylinder 18 by means of an annular retaining ring 46. Central to the cap 44 is a gas charging valve 45 which is closed when sufficient gas has been introduced into the accumulator, i.e. the piston is abutting the projection 32, sufficient to reach the predetermined pressure therein. The gas charging valve is then sealed closed.

A Silicone O ring static seal 47 annularly shaped is deposed around cap 42 so as to provide a liquid seal between cap 42 and cylindrical wall 34. Cap 42 is secured to wall 34 by means of a retainer 54. The forward cap 40 is secured to cylindrical wall 34 by means of a weld 56 annularly deposed therebetween. The wall 34 is preferably made of a seamless steel shell.

The gas is sealed in the accumulator portion of the shock absorber, that is within the cylinder 18, by means of annular static sealing Silicone O rings 58 and 60, deposed on cap 44 and piston 16 respectively. An annular T ring 62 prevents gas entrainment to liquid conducting portions of the apparatus. The T ring 62 is fixed on piston 16. An annular Teflon guide 64 fixed on piston 16 provides a bearing surface against the cylinder 18 for the translation of the piston 16 along axis 30. Port 66 in piston 16 conducts liquid to annular chamber 68 on piston 16. By this means, liquid pressure is equalized on both sides of the Teflon guide 64. Port or aperture 22 is a cylindrical aperture, the axis thereof being at an angle with respect to axis 30.

Operation

The piston is in its normal position when it is abutting the annular projection 32. When the piston is in its normal position, the pressure of the gas inside the cylinder 18 is at its normal preselected value. When the liquid in the hydraulic system in which the shock absorber is connected is at a pressure less than the preselected pressure of the gas within the cylinder 18, liquid in the system is prevented from entering the conduit 20. When a pressure surge occurs such that the pressure amplitude increases to an extent greater than the preselected pressure of the gas within the cylinder 18, the piston 16 is translated along axis 30. This translation of the piston away from the annular projection 32 immediately opens up the entire port or aperture 22 for liquid conduction and entry of liquid into the conduit 20. Simultaneous to the translation of the piston 16, the gas within cylinder 18 is adiabatically compressed thus resisting further translation of the piston 16 along axis 30. The allowance of passage of fluid through conduit 20 through the apertures in ring 28 and out through the exhaust or exit port, reduces the amplitude of pressure on liquid in the hydraulic system.

I claim:

1. A shock absorber comprising a piston and cylinder assembly containing a compressible fluid:
    an annular chamber surrounding the cylinder;
    a noncompressible fluid exit port having a cylindrical surface coaxial with said annular chamber;
    means communicating noncompressible fluid from said annular chamber to said exit port comprising a ring with apertures for conducting noncompressible fluid from said annular chamber to said exit port;
    said ring being coaxial with said annular chamber and said exit port and being rigidly juxtaposed between said exit port, said annular chamber, and said cylinder;
    a noncompressible fluid entry port coaxial with said cylinder and said annular chamber;
    a noncompressible fluid aperture in said annular chamber near said entry port;
    said piston having a neck with a smaller external diameter than the rest of said piston, said neck blocking passage of noncompressible fluid from said entry port to said annular chamber when said piston is in a normal position;
    the compressible fluid in said cylinder being at a preselected pressure when said piston is in said normal position;
    said piston being operable to move in a direction compressing said compressible fluid and immediately unblocking entirely said entry aperture of said annular chamber when the pressure of the noncompressible fluid in said entry port exceeds the pressure of said compressible fluid in said cylinder.

2. A shock absorber comprising a piston and cylinder assembly containing a compressible fluid:
    means defining a chamber adjacent a wall of the cylinder;
    a noncompressible fluid exit port for said chamber;
    a noncompressible fluid entry port for said chamber;
    a noncompressible fluid opening in said chamber at said entry port;
    said piston having a portion blocking passage of noncompressible fluid from said entry port to said chamber when said piston is in a normal position;
    the compressible fluid in said cylinder being at a preselected pressure when said piston is in said normal position; and
    said piston being operable to move in a direction compressing said compressible fluid and unblocking said entry opening of said chamber when the pressure of the noncompressible fluid in said entry port exceeds the pressure of said compressible fluid in said cylinder.

3. A shock absorber comprising a piston and cylinder assembly containing a compressible fluid;
    means cooperating with said cylinder to provide a chamber adjacent the exterior of said cylinder and having entry and exit ports for noncompressible fluid and a noncompressible fluid opening at said entry port;
    said piston blocking said opening and passage of noncompressible fluid therethrough when in its normal position;
    the compressible fluid in said cylinder being at a pressure above atmospheric when said piston is in its normal position; and
    said piston being operable to move in a direction compressing said compressible fluid and unblocking said opening when the pressure of the noncompressible fluid in said entry port exceeds the pressure of the compressible fluid in said cylinder.

References Cited

UNITED STATES PATENTS

| | | | |
|---|---|---|---|
| 2,538,375 | 1/1951 | Montgomery. | |
| 2,683,467 | 7/1954 | Greer | 138—31 |
| 2,688,984 | 9/1954 | Snyder | 138—31 |
| 2,703,108 | 3/1955 | McCuistion | 138—31 |
| 2,715,419 | 8/1955 | Ford et al. | 138—31 |
| 2,734,531 | 2/1956 | Bizak | 138—31 |
| 2,742,929 | 4/1956 | Treseder | 138—31 |
| 2,753,892 | 7/1956 | Deardorff et al. | 138—31 |
| 3,004,561 | 10/1961 | Henry | 138—31 |
| 3,084,717 | 4/1963 | Purcell | 138—31 |
| 3,121,479 | 2/1964 | Dillenburger et al. | 138—30 X |

FOREIGN PATENTS 933    1/1891    Great Britain.

LAVERNE D. GEIGER, *Primary Examiner.*

N. C. CUDDEBACK, *Assistant Examiner.*